US011858156B2

(12) United States Patent
Kim et al.

(10) Patent No.: US 11,858,156 B2
(45) Date of Patent: Jan. 2, 2024

(54) LUBRICATING STRIP FOR A RAZOR CARTRIDGE AND RAZOR CARTRIDGE USING THE SAME

(71) Applicant: DORCO CO., LTD., Seoul (KR)

(72) Inventors: Doo Shik Kim, Seoul (KR); Tae Young Lee, Seoul (KR)

(73) Assignee: Dorco Co., Ltd., Seoul (KR)

( * ) Notice: Subject to any disclaimer, the term of this patent is extended or adjusted under 35 U.S.C. 154(b) by 0 days.

(21) Appl. No.: 16/739,038

(22) Filed: Jan. 9, 2020

(65) Prior Publication Data

US 2020/0223079 A1 Jul. 16, 2020

(30) Foreign Application Priority Data

Jan. 10, 2019 (KR) ........................ 10-2019-0003311

(51) Int. Cl.
*B26B 21/44* (2006.01)

(52) U.S. Cl.
CPC ................................. *B26B 21/443* (2013.01)

(58) Field of Classification Search
CPC .................................................... B26B 21/443
See application file for complete search history.

(56) References Cited

U.S. PATENT DOCUMENTS 5,388,331 A * 2/1995 Doroodian-Shoja Siamak ........... B26B 21/4087 30/41.7
5,687,485 A 11/1997 Shurtleff et al.
5,761,814 A 6/1998 Anderson et al.
5,956,848 A 9/1999 Tseng et al.
5,956,851 A 9/1999 Apprille et al.
(Continued)

FOREIGN PATENT DOCUMENTS

EP 2918381 9/2015
JP 2003522619 7/2003
(Continued)

OTHER PUBLICATIONS

Korean Intellectual Property Office Application No. 10-2019-0003311, Office Action dated May 28, 2020, 5 pages.
(Continued)

*Primary Examiner* — Evan H MacFarlane
*Assistant Examiner* — Liang Dong
(74) *Attorney, Agent, or Firm* — Knobbe, Martens, Olson & Bears, LLP

(57) ABSTRACT

The lubricating strip for a razor cartridge includes a first layer including a first lubricating material having a first color; and a second layer disposed under the first layer and including a second lubricating material having a second color different from the first color. The first layer and the second layer are configured to form at least one boundary line, which is not parallel to a straight line along a width direction of the lubricating strip, on a cross-section of the lubricating strip cut in a direction perpendicular to a longitudinal direction of the lubricating strip; and define multiple shaving layers including a first shaving layer including the first layer, a second shaving layer including the first layer and the second layer, and a third shaving layer including the second layer, the multiple shaving layers being arranged along a straight line parallel to a height direction of the lubricating strip.

16 Claims, 8 Drawing Sheets

210

(56) References Cited

U.S. PATENT DOCUMENTS

| | | | | |
|---|---|---|---|---|
| 6,041,926 | A | 3/2000 | Petricca et al. | |
| 6,052,903 | A | 4/2000 | Metcalf et al. | |
| 6,185,822 | B1 | 2/2001 | Tseng et al. | |
| 6,212,777 | B1 | 4/2001 | Gilder et al. | |
| 6,298,559 | B1 | 10/2001 | Kwiecien et al. | |
| 6,301,785 | B1 | 10/2001 | Kwiecien et al. | |
| 6,442,839 | B1 | 9/2002 | Tseng et al. | |
| 6,516,518 | B1 | 2/2003 | Garraway et al. | |
| 6,594,904 | B1 | 7/2003 | Tseng | |
| 6,612,040 | B2 | 9/2003 | Gilder | |
| 6,684,513 | B1 | 2/2004 | Clipstone et al. | |
| 6,944,952 | B1 | 9/2005 | Tseng | |
| 7,069,658 | B2 | 7/2006 | Tseng | |
| 9,694,502 | B2 * | 7/2017 | Pesikov | B26B 21/44 |
| 2001/0023539 | A1 | 9/2001 | Kwiecien et al. | |
| 2002/0000041 | A1 * | 1/2002 | Doroodian-Shoja | B26B 21/4087 30/41.7 |
| 2010/0011588 | A1 * | 1/2010 | Wang | B26B 21/4025 30/41 |
| 2010/0122462 | A1 | 5/2010 | Ndou et al. | |
| 2010/0122463 | A1 | 5/2010 | Ndou et al. | |
| 2010/0122464 | A1 * | 5/2010 | Ndou | B26B 21/4031 30/41 |
| 2013/0111760 | A1 * | 5/2013 | Coffin | B26B 21/443 30/41 |
| 2015/0184106 | A1 * | 7/2015 | Ozawa | A61L 29/049 508/386 |

FOREIGN PATENT DOCUMENTS

| | | |
|---|---|---|
| JP | 2012508084 | 4/2012 |
| KR | 1020130087158 | 8/2013 |
| WO | 2001060572 | 8/2001 |
| WO | 2010056781 | 5/2010 |
| WO | 2010056782 | 5/2010 |

OTHER PUBLICATIONS

Korean Intellectual Property Office Application No. 10-2019-0003311, Notice of Allowance dated Aug. 5, 2020, 2 pages.

European Patent Office Application Serial No. 20150908.0, Search Report dated May 12, 2020, 8 pages.

* cited by examiner

LUBRICATING STRIP FOR A RAZOR CARTRIDGE AND RAZOR CARTRIDGE USING THE SAME

CROSS-REFERENCE TO RELATED APPLICATIONS

Pursuant to 35 U.S.C. § 119(a), this application claims the benefit of earlier filing date and right of priority to Korean Patent Application Number 10-2019-0003311, filed on Jan. 10, 2019, the contents of which are hereby incorporated by reference herein in its entirety.

TECHNICAL FIELD

The present disclosure relates to a lubricating strip for a razor cartridge and a razor cartridge using the same.

BACKGROUND

The statements in this section merely provide background information related to the present disclosure and do not necessarily constitute prior art.

In using a wet razor, several factors can be uncomfortable for the user.

For example, the frictional force generated between a blade housing and the skin, cutting force applied to the hair for cutting, stimulation on a skin lesion, etc. may be inconvenient for the user.

To reduce this inconvenience, shaving aids such as shaving foams, shaving gels, and shaving creams have conventionally been used.

In particular, the shaving aid contains a lubricating component and is adapted to be applied to the user's skin before or after shaving. This can reduce irritation to the skin when shaving.

However, a pre-shave aid is susceptible to be evaporated away before shaving, or pushed away from the application position by the repeated stroke of the shaver.

In addition, post-shave aid applied to the skin after shaving is short of responding appropriately to the skin irritation occurring during shaving.

In order to solve these issues, lubricating strips have been introduced to be disposed on the razor cartridge.

In particular, the lubricating strip may be arranged in the guard area or the cap area of the razor cartridge. This allows the lubricating component to be applied to the user's skin immediately before or after the cutting of the hair by the cutting blade.

Recently emerged lubricating strips have an additional indicator function (hereinafter referred to as 'indicating lubricating strip') for informing a replacement time of a razor cartridge in addition to the function of applying a lubricating component to the skin.

Specifically, the indicating lubricating strip has a plurality of layers having different colors from each other, whereby different colors are revealed according to the degree of usage.

As a result, the user may be visually informed of the degree of usage of the razor cartridge.

However, the conventional indicating lubricating strip is bound to provide the user with limited information when it is composed of two colors or complicate the manufacturing process of the lubricating strip when it is composed of three or more colors.

On the other hand, even if the user checks the color of the indicating lubricating strip, it is difficult to ascertain whether the razor cartridge is new or has been used.

SUMMARY

In accordance with at least one embodiment, the present disclosure provides a lubricating strip configured for use in a razor cartridge, the lubricating strip including a first layer including a first lubricating material having a first color; and a second layer disposed under the first layer and including a second lubricating material having a second color different from the first color. The first layer and the second layer are configured to form at least one boundary line, which is not parallel to a straight line along a width direction of the lubricating strip, on a cross-section of the lubricating strip cut in a direction perpendicular to a longitudinal direction of the lubricating strip; and define multiple shaving layers including a first shaving layer including the first layer, a second shaving layer including the first layer and the second layer, and a third shaving layer including the second layer, the multiple shaving layers being arranged along a straight line parallel to a height direction of the lubricating strip.

DETAILED DESCRIPTION

Figure 1:
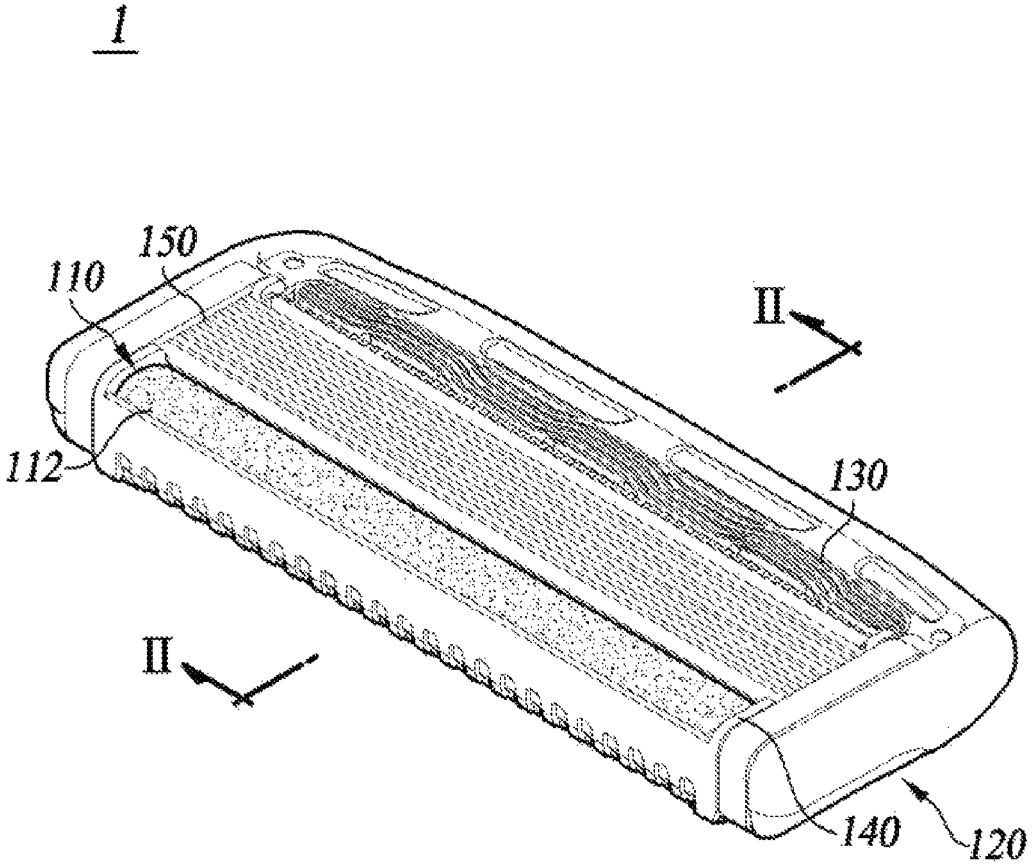
FIG. 1 is a perspective view of a razor cartridge according to at least one embodiment of the present disclosure.

The present disclosure is primarily aimed at providing a lubricating strip for a razor cartridge, which has two layers having different colors and divided into a plurality of shaving sections, the lubricating strip provided with various indicators indicating a usage state of the razor cartridge.

It is also an object of the present disclosure to provide a lubricating strip for a razor cartridge providing an indication of a pre-use condition of the razor cartridge.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

In describing the components of the embodiments according to the present disclosure, various terms such as first, second, i), ii), a), b), etc., may be used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary.

Figure 4:
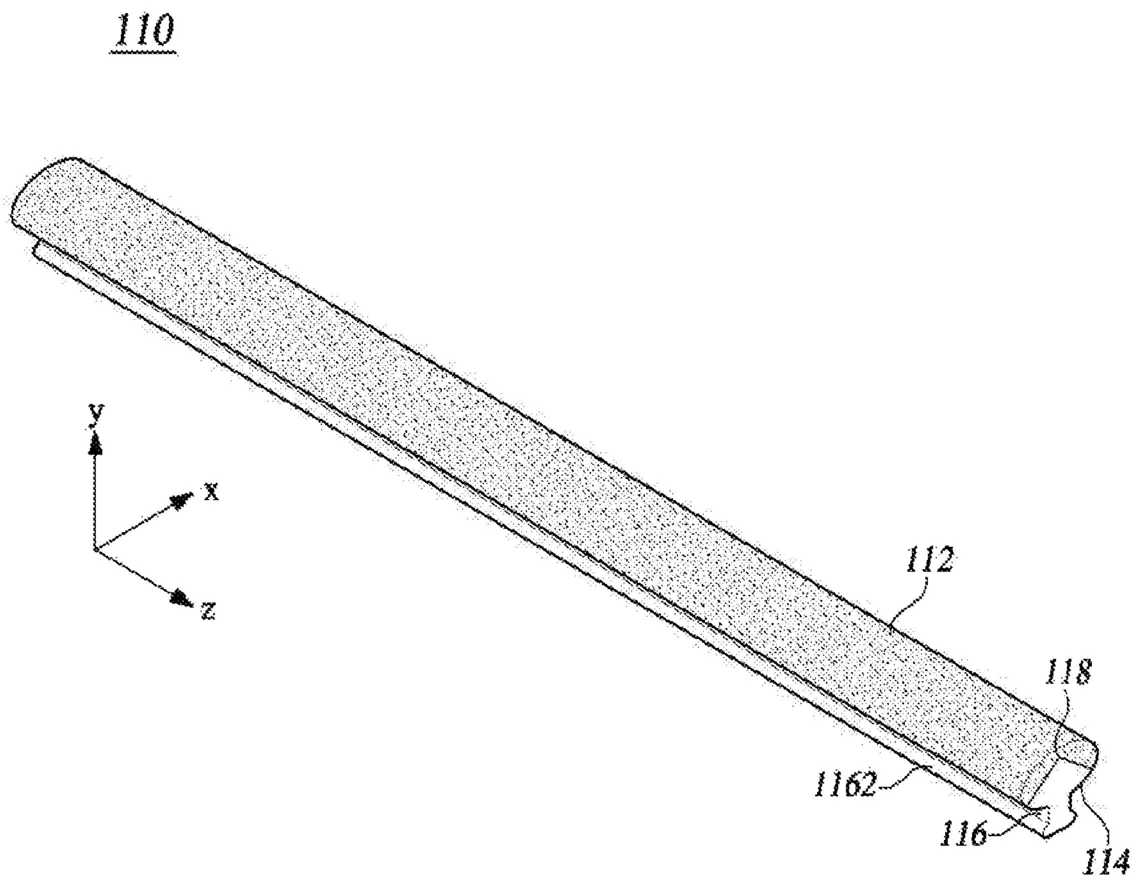
FIG. 4 is a perspective view of a lubricating strip for a razor cartridge according to at least one embodiment of the present disclosure.

In addition, the terms width direction, height direction, and length direction as used herein refer to the direction along the width of a lubrication strip, the direction along the height thereof, and the direction along the length thereof, respectively. For example, FIG. 4 illustrates the x-axis, y-axis, and z-axis directions that correspond to the width direction, the height direction, and the length direction of the lubricating strip, respectively.

FIG. 1 is a perspective view of a razor cartridge 1 according to at least one embodiment of the present disclosure.

Figure 2:
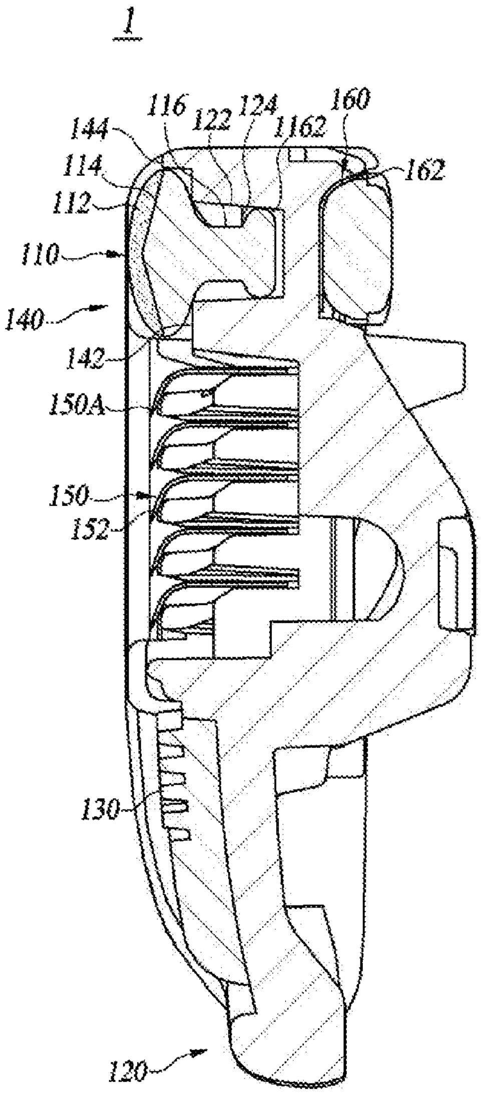
FIG. 2 is a cross-sectional view of the razor cartridge taken on the line II-II of FIG. 1, according to the embodiment of the present disclosure.

FIG. 2 is a cross-sectional view of the razor cartridge 1 taken on the line II-II of FIG. 1, according to the embodiment of the present disclosure.

The razor cartridge 1 may include a lubricating strip 110, a blade housing 120, a guard 130, a cap 140, and one or more cutting blades 150 as shown in FIG. 1, and also a trimming blade 160 as shown in FIG. 2.

The blade housing 120 may accommodate one or more cutting blades 150 (may be referred to as "the cutting blade" hereinafter) having a cutting edge 152.

The guard 130 may be located in front of the cutting blade 150. Specifically, the guard 130 may be disposed on the upper surface of the blade housing 120, to which the cutting edge 152 of the cutting blade 150 is directed.

During shaving, the guard 130 may stretch the skin before the cutting blade 150 cuts the hair.

This erects the hair to be perpendicular to the skin surface and further assists the cutting blade 150 in cutting the hair.

The guard 130 may have an elastic member to effectively stretch the skin.

The cap 140 may be located at the rear of the cutting blade 150 on the upper surface of the blade housing 120.

The guard 130 and the cap 140 may contact the user's skin when shaving, thereby defining a shaving plane.

The lubricating strip 110 may be disposed on the upper surface of the blade housing 120, and may apply a lubricating component to the skin when shaving.

To this end, the lubricating strip 110 may be arranged in an area to be in contact with the skin. Specifically, the lubricating strip 110 may be disposed adjacent to one or more of the guard 130 and the cap 140.

In FIGS. 1 and 2, the lubricating strip 110 is illustrated as being provided in the cap 140, but the present disclosure is not limited thereto. For example, in another embodiment, the lubricating strip 110 may be provided only in the guard 130 or may be provided in both the guard 130 and the cap 140.

The cutting blade 150 may be accommodated on one side of the blade housing 120 and may have the cutting edge 152 for cutting hair.

Specifically, the cutting edge 152 of the cutting blade 150 may be configured to cut the hair during the primary shaving.

The cutting edge 152 may face the top surface of the blade housing 120.

The trimming blade 160 may be accommodated on the other side of the blade housing 120, and may have a trimming edge 162 for cutting the hair during trimming shaving.

The trimming edge 162 may face the bottom surface of the blade housing 120, which is opposite the facing direction of the cutting edge 152 of the cutting blade 150.

As shown in FIG. 2, the cap 140 may include a first support bar 142 and a second support bar 144.

The first support bar 142 may be positioned in front of the lubricating strip 110 in the width direction. Specifically, the first support bar 142 may be located between the lubricating strip 110 and the rearmost cutting blade 150A.

The first support bar 142 may be located at the rear in the height direction of the lubricating strip 110 based on the top exposure surface of the lubricating strip 110 and the second support bar 144. The first support bar 142 may be completely covered by the lubricating strip 110.

In this case, between the rearmost cutting blade 150A and the lubricating strip 144, the skin can be prevented from being caught by the first support bar 142 when shaving, whereby the razor cartridge 1 can glide well by the lubricating strip 110 behind the rearmost cutting blade 150A.

In addition, the skin will be in contact with the lubricating strip 110 right after the rearmost cutting blade 150A passes the skin, thus improving the lubrication performance by the lubricating strip 110.

The second support bar 144 may be located at the rear in the width direction of the lubricating strip 110.

The second support bar 144 may be located at the rear in the height direction of the lubricating strip 110 based on the top exposure surface of the lubricating strip 110.

Specifically, at least a portion of the second support bar 144 may be exposed to the outside when the second support bar 144 is not covered by the lubricating strip 110.

The second support bar 144 according to at least one embodiment of the present disclosure is located forwardly of the first support bar 142 in the width direction, and thus, as the lubricating strip 110 is worn out, the second support bar 144 may be in direct contact with the skin.

Then, the second support bar 144, in cooperation with the guard 130 located in front thereof, can define the shaving plane of the cutting edge 152, whereby preventing the shaving plane from declining excessively low, and thus, saving the skin from being cut by the cutting edge 152.

For example, an embodiment may be considered where the second support bar 144 is not exposed to the outside and the shaving plane is defined by the lubricating strip 110 that becomes relatively low in height when the lubricating strip 110 is excessively worn flat to a third shaving layer A3 which will be described.

In that case, the exposure of the cutting edge 152 may be salient, which makes the skin susceptible to cuts by the cutting edge 152 when shaving.

However, the present disclosure is not bound by specific illustrations of the configurations of the first support bar 142 and the second support bar 144. For example, according to another embodiment, both the first support bar 142 and the second support bar 144 may be completely covered by the lubricating strip 110, or the first support bar 142 and the second support bar 144 may be configured to be partially exposed to the outside, respectively.

Figure 3:
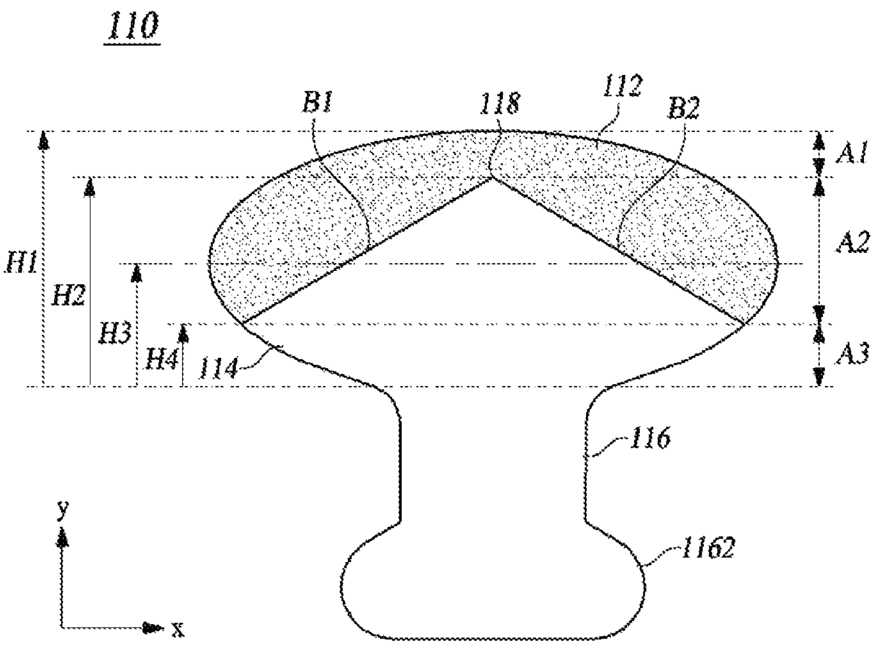
FIG. 3 is a front view of a lubricating strip for a razor cartridge according to at least one embodiment of the present disclosure.

FIG. 3 is a front view of a lubricating strip 110 for a razor cartridge according to at least one embodiment of the present disclosure.

FIG. 4 is a perspective view of a lubricating strip 110 for a razor cartridge according to at least one embodiment of the present disclosure.

As shown in FIGS. 3 and 4, the lubricating strip 110 may include a first layer 112, a second layer 114, and a support portion 116.

The first layer 112 may include a first lubricating material which may have a first color.

The second layer 114 may be disposed under the first layer 112 and may include a second lubricating material. The second lubricating material may have a second color different from the first color.

The first color and the second color may be configured to be complementary to each other for intuitive recognition by the user, but the present disclosure is not limited thereto.

The first lubricating material and the second lubricating material may include a water-soluble polymer and a water-insoluble polymer.

The water-soluble polymer, which is respectively more soluble in water, is a component that performs lubricating performance substantially on the lubricating strip 110.

The higher the proportion of the water-soluble polymer, the better the lubrication performance of the lubricating strip 110 is, which may accelerate the wear of the lubricating strip 110.

The water-insoluble polymer is relatively insoluble in water and serves to maintain the top shape of the lubricating strip 110.

The higher the ratio of the water-insoluble polymer, the better the durability of the lubricating strip 110 is, which may degrade the lubrication performance of the lubricating strip 110.

Therefore, in the lubricating strip 110, the weight ratio of the water-soluble polymer of the upper layer of the first lubricating component may have a larger value than that of the water-soluble polymer of the lower layer of the second lubricating material.

For example, when the water-soluble polymer and the water-insoluble polymer have the total weight of 100%, the weight ratio of the water-insoluble polymer of the first lubricating material maybe 10% to 40%, and the weight ratio of the water-soluble polymer of the first lubricating material maybe 60% to 90%. The second lubricating material may have 30% to 50% of weight ratio of the water-insoluble polymer and 50% to 70% of weight ratio of the water-soluble polymer.

This configuration improves the lubrication performance of the first layer 112 which is frequently in contact with the skin and enhances the durability of the second layer 114 that underprops the first layer 112.

However, the present disclosure is not limited thereto, and the weight ratio of the water-soluble polymer of the first lubricating material may have the same value as that of the water-soluble polymer of the second lubricating material.

This leaves difference only in the amount of the master batch mixed with each lubricating component or the type of the master batch between the first lubricating material and the second lubricating material, which can provide an advantage in the manufacturing process of the lubricating strip 110.

For example, in the preparation of the first lubricating material and the second lubricating material, the water-soluble polymer and the water-insoluble polymer may undergo a common mixing process, and then, only the mixing process of the master batch may be performed separately.

The water-insoluble polymer of the first lubricating material and the water-insoluble polymer of the second lubricating material may include one or more of polystyrene (PS), polypropylene (PP), polyethylene (PE), thermoplastic elastomer (TPE), acrylonitrile butadiene styrene (ABS), or polycarbonate (PC).

The water-soluble polymer of the first lubricating material and the water-soluble polymer of the second lubricating material may include one or more of polyethylene oxide (PEO), polyvinyl pyrrolidone (PVP), polyacrylamide (PAM), polyvinyl imidazoline (PVI), polyvinyl alcohol (PVA), polysulfone (PSU), polyhydroxyethyl methacrylate (PHEMA), or polyethylene glycol (PEG).

The first lubricating material and the second lubricating material may include a lubrication performance enhancer.

The lubrication performance enhancer of the first lubricating material and the second lubricating material may include one or more of a super absorbent polymer (SAP) or a polyalkylene oxide (PAO).

Specifically, SAP and PAO included in the lubrication performance enhancer may help dissolve the water-soluble polymer by absorbing water around the lubricating strip 110.

The lubrication performance enhancers of the first lubricating material and the second lubricating material may each have a weight ratio of 0.1% to 10%.

At least one of the first lubricating material or the second lubricating material may include a master batch.

The master batch is a coloring raw material for coloring the plastic and may be included in the first lubricating material and the second lubricating material to have a first color and a second color, respectively.

However, the present disclosure is not limited thereto, and only one of the first and second layers may include the master batch, and the other may not include thereof.

In this case, the layer without the master batch may have a white color.

The first layer 112 and the second layer 114 may be manufactured by a method of extrusion or injection, but the present disclosure is not limited thereto.

The first layer 112 and the second layer 114 may at least partially form boundary lines that are not parallel to a width direction of the lubricating strip, on a cross-section of the lubricating strip 110 cut in the width direction (direction perpendicular to the longitudinal direction) of the lubricating strip 110.

For example, as shown in FIG. 3, the first layer 112 and the second layer 114 have a left boundary line B1 of a positive slope with respect to a straight line parallel to the width direction of the lubricating strip 110. The first layer 112 and the second layer 114 have a right boundary line B2 of a negative slope with respect to the straight line parallel to the width direction of the lubricating strip 110. The left boundary line B1 and the right boundary line B2 meet at a top point 118 of the second layer 114.

The lubricating strip 110 according to at least one embodiment of the present disclosure features that the first layer 112 and the second layer 114 have such boundary lines as configured to be non-parallel to the width direction of the lubricating strip 110, whereby displaying a shape-changing cross-section of the lubricating strip 110 in response to increased degree of usage thereof. A detailed description in this regard will be presented in relation to FIG. 5.

Although FIGS. 3 and 4 illustrate the boundary lines between the first layer 112 and the second layer 114 as having a triangular profile facing the top of the lubricating strip 110, the present disclosure is not limited thereto. Various embodiments of the profile of the boundary lines between the first layer 112 and the second layer 114 are described in relation to FIGS. 8A to 8D.

Referring again to FIGS. 3 and 4, the first layer 112 and the second layer 114 include a first shaving layer A1, a second shaving layer A2, and a third shaving layer A3.

Specifically, the first layer 112 and the second layer 114 may have their first shaving layer A1, second shaving layer A2, and third shaving layer A3 arranged to be distinguished from each other in a direction parallel to the height direction of the lubricating strip 110.

The first shaving layer A1 may include the first layer 112. In particular, the first shaving layer A1 may include only the first layer 112 and may not include the second layer 114.

The second shaving layer A2 may be located below the first shaving layer A1 and may include the first layer 112 and the second layer 114.

The third shaving layer A3 may be located below the second shaving layer A2 and may include the second layer 114. In particular, the third shaving layer A3 may include only the second layer 114 and may not include the first layer 112.

In the first shaving layer A1, the first layer 112 may be configured to be removed by the first use of the lubricating strip 110.

Here, the first use refers to the use of the razor from start to finish of shaving for the first time.

Thus, first use will typically be made of a plurality of strokes, although the present disclosure is not limited thereto.

For example, the first use may be made of one stroke, depending on the type of shaving.

In the first shaving layer A1, the first layer 112 may have a sufficient degree of thickness or solubility so that it can be removed by first use.

Specifically, the first layer 112 in the first shaving layer A1 may have a sufficient degree of thickness or solubility to fade away until the user finishes shaving in the first use of the razor.

The first layer 112 in the first shaving layer A1 may have a sufficient degree of solubility or thickness so that it can be removed by the first use.

By first use, as the first layer 112 is removed from the first shaving layer A1, the first shaving layer A1 may also be removed, thereby revealing the second shaving layer A2.

In this case, the first shaving layer A1 including only the first layer 112 may display the first color alone, but the second shaving layer A2 including the first layer 112 and the second layer 114 may display the first and second colors together.

Therefore, the user can recognize that the razor cartridge is in an unused condition by checking the lubricating strip 110 marked with only the first color.

Conversely, the user can recognize that the razor cartridge has been used at least once by checking the lubricating strip 110 that is marked with the first and second colors together.

Thus, the first shaving layer A1 according to at least one embodiment of the present disclosure may serve as an indicator for informing the user that the razor cartridge 1 is in an unused condition.

For the indicator function of the first shaving layer A1, in the unused condition, most of the area of the lubricating strip 110 is preferably indicated by the first color of the first layer 112.

Accordingly, prior to using the razor cartridge 1, with the lubricating strip 110 mounted to the razor cartridge 1, the first layer 112 may be configured to have its top exposure surface occupy 95% to 100% of the top exposure surface of the lubricating strip 110.

Figure 8A:
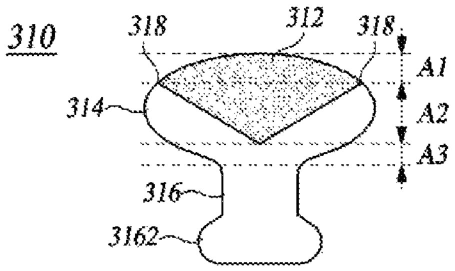
FIGS. 8A to 8D are diagrams of lubricating strips for a razor cartridge according to further embodiments of the present disclosure.

For example, as in the embodiment shown in FIG. 8A, a lubricating strip 310 may have a first layer 312 and a second layer 314, wherein the first layer 312 has a curved top exposure surface, and the first layer 312 and the second layer 314 have a concave down profile of boundary so that some of the second layer 314 in second shaving layer A2 may be exposed in a state that the lubricating strip 310 is mounted to the razor cartridge.

Specifically, the second layer 314 of the second shaving layer A2 may have its portion exposed at both sides in the width direction of the lubricating strip 310.

However, even in this case, the portion occupied by the second layer 314 of the second shaving layer A2 is very small in the entire top exposure surface of the lubricating strip 310 which thereby continues to offer the indicator function intact for indicating that the first shaving layer A1 is in an unused condition.

Referring back to FIGS. 3 and 4, the top exposure surface of the lubricating strip 110 may have a round shape that includes curved surfaces.

The round shape of the top exposure surface of the lubricating strip 110 causes the first layer 112 to have its central area protruded relative to the peripheral area thereof in the first shaving layer A1.

As a result, the first layer 112 which substantially performs the lubricating function may have better contact with the skin, thereby further improving the function of applying the lubricating component of the lubricating strip 110 to the skin.

In addition, the relatively salient central area of the first layer 112 as compared to the surrounding area facilitates smooth removal of the first shaving layer A1, whereby further improving the indicator function of the first shaving layer A1 when indicating its unused condition.

However, the present disclosure is not limited thereto, and the top exposure surface of the lubricating strip 110 may have a flat surface that does not include a curved surface. In this case, a contact area of the first layer 112 in contact with the skin may be increased.

The cross-section of the lubricating strip 110 cut in the direction perpendicular to the height direction of the lubricating strip 110 in the second shaving layer A2 may include at least some of the first layer 112 and at least some of the second layer 114.

Therefore, when the lubricating strip 110 is used within the second shaving layer A2, the exposed surface of the lubricating strip 110 may reveal both the first layer 112 having the first color and the second layer 114 having the second color.

In this way, the user can recognize that the razor cartridge is in a used condition by checking the lubricating strip 110 that displays both the first color and the second color.

In addition, in the second shaving layer A2, at least some of the boundary between the first layer 112 and the second layer 114 may be configured not to be parallel to the width direction of the lubricating strip 110, whereby displaying shape-changing exposed surfaces of the lubricating strip 110 in response to increased degree of usage thereof.

This allows the user to grasp the degree of usage of the razor cartridge by confirming the shape formed by the first and second colors.

The third shaving layer A3 having only the second layer 114 may display the second color alone, and the user may see the lubricating strip 110 by only the second color displayed to recognize that the relevant razor cartridge has been completely used and needs to be replaced with a new razor cartridge.

As a result, the third shaving layer A3 according to at least one embodiment of the present disclosure may serve as an indicator that informs the user of the complete use and the replacement time of the razor cartridge 1.

The lubricating strip 110 may have a support 116 which extends from the second layer 114 in the height direction of the lubricating strip 110. Of the lubricating strip 110, the support 116 may be an area inserted into and received in the blade housing 120.

Specifically, the support 116 may be inserted into a recess 122 located in the rear of the blade housing 120 as shown in FIG. 2, and for this purpose, may include a hook 1162.

The hook 1162 may snap-fit with a protrusion 124 (in FIG. 2) formed at one side of the recess 122.

The support 116 may be made of the same material as the second layer 114. In this case, the second layer 114 and the support 116 may be integrally formed by extrusion.

However, the present disclosure is not limited thereto, and the support 116 may be made of a material different from that of the second layer 114.

For example, the support 116 may include a higher proportion of water-insoluble polymer as compared to the second layer 114 to improve durability.

In FIGS. 1 to 4, the lubricating strip 110 is illustrated as including the support 116 which is inserted into the blade housing 120 so that the lubricating strip 110 is mounted to the razor cartridge 1. However, the present disclosure is not limited thereto.

For example, according to another embodiment, the lubricating strip 110 may not include the support 116, in which case the lubricating strip 110 may be mounted to the razor cartridge 1 by way of attaching one side of the second layer 114 to one or more of the guard 130 and the cap 140.

Figure 5:
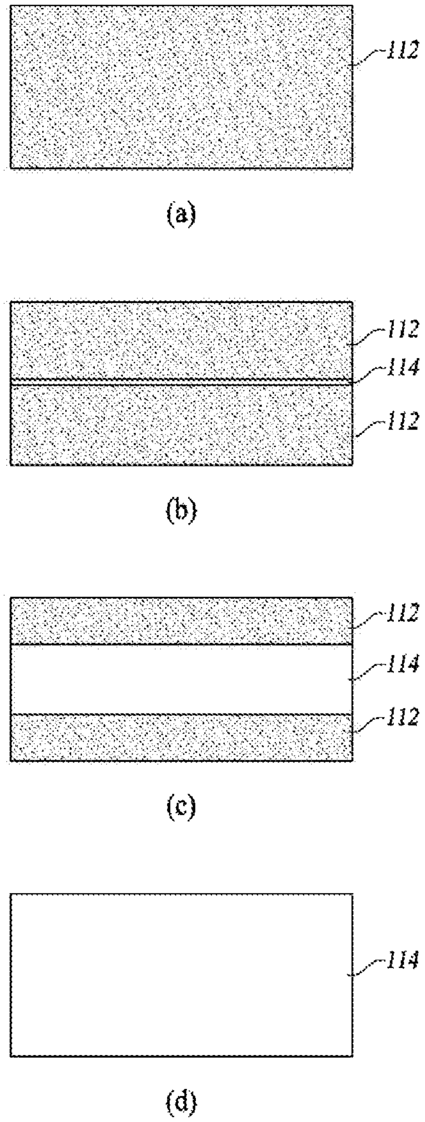
FIG. 5 illustrates a lubricating strip for a razor cartridge in plan view according to at least one embodiment of the present disclosure, states of the lubricating strip changed as the lubricating strip is used.

FIG. 5 illustrates plan views of various states of a lubricating strip 110 for a razor cartridge caused by use of the lubricating strip according to at least one embodiment of the present disclosure.

Specifically, FIG. 5 shows at (a) to (d) the exposed surface sections of the lubricating strip 110 when having vertical heights of H1 to H4 in FIG. 3, respectively.

As shown in FIG. 5 at (a), when the lubricating strip 110 has a vertical height of H1, that is, when the lubricating strip 110 is yet to be used, the exposed surface of the lubricating strip 110 may show the first layer 112 by the first color alone.

In this case, the user can recognize that the razor cartridge is in an unused condition by checking the lubricating strip 110 displaying the first color alone.

As shown in FIG. 5 at (b), when the lubricating strip 110 has a vertical height of H2, that is, when the first shaving layer A1 is removed by the first use of the lubricating strip 110, the lubricating strip 100 renders its exposed surface to firstly display the second color of the second layer 114.

At this time, the second color of the second layer 114 visible on the exposed surface of the lubricating strip 110 may have a shape of an elongated strip extending along the longitudinal direction of the lubricating strip 110.

The user can recognize that the razor cartridge has been used at least once by seeing the elongated strip of the second color displayed on the lubricating strip 110.

As shown in FIG. 5 at (c), when the lubricating strip 110 has a vertical height of H3, that is, when the lubricating strip 110 is used down to the mid-level, the exposed surface of the lubricating strip 110 may show a decreased ratio of the first color of the first layer 112 and an increased ratio of the second color of the second layer 114 compared with the state shown at (d).

Since the boundary lines between the first layer 112 and the second layer 114 have a triangular profile that is not parallel to the width direction of the lubricating strip 110, the elongated strip of the second color shown in FIG. 5 at (b) will increase widthwise in response to increased use of the lubricating strip 110.

The user can recognize that the razor cartridge has been used more compared to the state shown in FIG. 5(*b*) by confirming that the width of the elongated strip of the second color has increased from that shown in FIG. 5(*b*).

As shown in FIG. 5 at (d), when the lubricating strip 110 has a vertical height of H4, that is, when the lubricating strip 110 has been used completely and the second shaving layer A2 has been entirely removed, the exposed surface of the lubricating strip 110 may display only the second color of the second layer 114.

In this case, the user can recognize that the razor cartridge has been used completely and needs to be replaced with a new one by confirming the lubricating strip 110 displaying the second color only.

The lubricating strip 110 according to at least one embodiment of the present disclosure can inform the user of the states of the lubricating strip 110, i.e., an unused state, an in-use state, and a used-up state, sequentially.

In the lubricating strip 110 according to at least one embodiment of the present disclosure, the boundary lines between the first layer 112 and the second layer 114 are configured to have a profile, at least a part of which is not parallel to the width direction of the lubricating strip 110, whereby informing the user of the degree of usage of the razor cartridge 1 by displaying the second-color zone of the second shaving layer A2 variously.

In another embodiment of the present disclosure shown in FIG. 6 and FIG. 7, unlike the above-illustrated embodiment of the present disclosure exemplified in FIGS. 1 to 5, the boundary lines between the first layer and the second layer may include a plurality of protrusion profiles which will be described below. The following will focus on distinctive features according to another embodiment of the present disclosure, and repetitive description of features substantially the same as the first-mentioned embodiment will be omitted to avoid redundancy.

Figure 6:
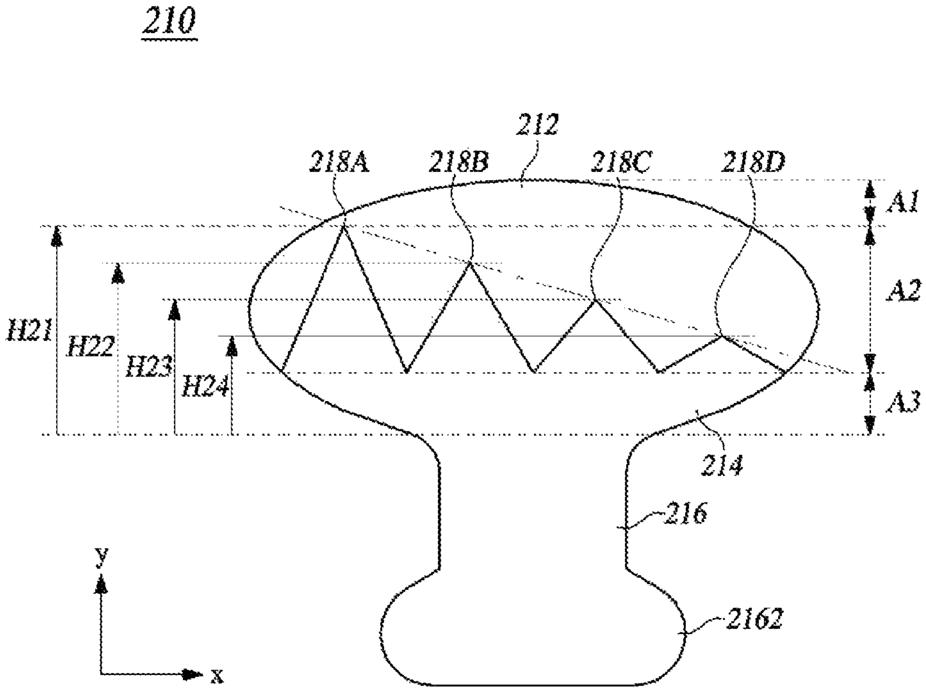
FIG. 6 is a front view of a lubricating strip for a razor cartridge according to another embodiment of the present disclosure.

FIG. 6 is a front view of a lubricating strip 210 for a razor cartridge according to another embodiment of the present disclosure. The lubricating strip 210 includes a support portion 216 and a hook 2162.

As shown in FIG. 6, on the cross-section of the lubricating strip 210 cut in the direction perpendicular to the longitudinal direction of the lubricating strip 210, the boundary lines between the first layer 212 and the second layer 214 may be defined by a plurality of protrusion profiles 218A-218D.

In the present specification, the protrusion profiles 218A-218D refer to portions projecting toward the top of the lubricating strip 210 on the boundary lines between the first layer 212 and the second layer 214. The first layer 212 and the second layer 214 include a first shaving layer A1, a second shaving layer A2, and a third shaving layer A3.

The protrusion profiles 218A-218D may each have a convex upward or a sharp point upward, but the present disclosure is not limited thereto.

The vertical heights of the vertices or peaks of the respective protrusion profiles 218A-218D may be configured to be different from each other.

For example, the first to fourth protrusion profiles 218A-218D sequentially arranged from the left side shown in FIG. 6 may have peaks different from each other in vertical height.

Specifically, the peaks of the first to fourth protrusion profiles 218A-218D are gradually decreased in vertical height from one side to another side, for example, from left to right.

However, the present disclosure is not limited thereto, and according to another embodiment, the plurality of protrusion profiles 218 with peaks having different vertical heights may not be sequentially disposed in order of vertical heights of the peaks.

Figure 7:
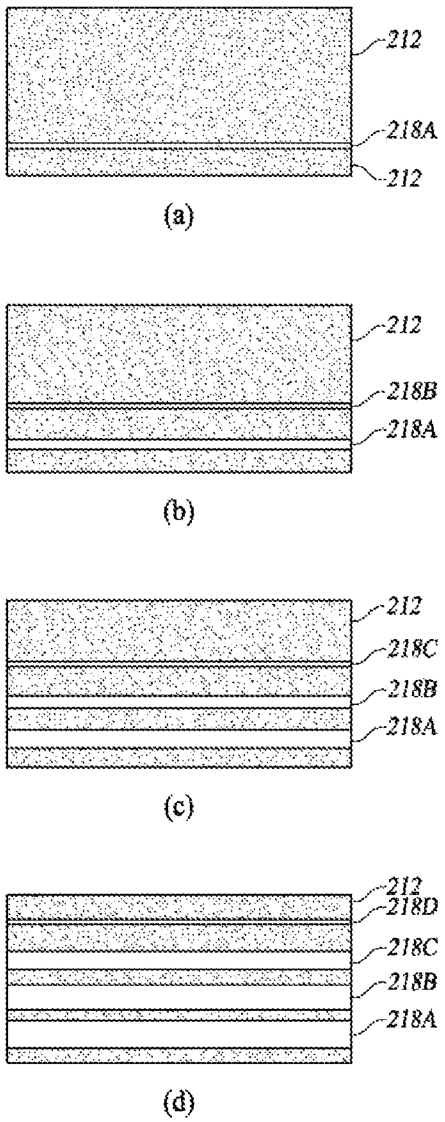
FIG. 7 illustrates a lubricating strip for a razor cartridge in plan view according to another embodiment of the present disclosure, states of the lubricating strip changed as the lubricating strip is used.

FIG. 7 illustrates plan views of various states of a lubricating strip 210 for a razor cartridge caused by use of the lubricating strip according to at least one embodiment of the present disclosure.

Specifically, FIG. 7 shows at (a) to (d) the exposed surface sections of the lubricating strip 120 having vertical heights of H21 to H24 in FIG. 6, respectively.

As shown in FIG. 7 at (a), where the lubricating strip 210 has a vertical height of H21, the first protrusion profile 218A when forced to reveal its peak may display an elongated strip of the second color in place of the first protrusion profile 218A.

As shown in FIG. 7 at (b), where the lubricating strip 210 has a vertical height of H22, the second protrusion profile 2188 when forced to reveal its peak may display an elongated strip of the second color in place of the second protrusion profile 218B.

At this time, two elongated strips of the second color are visible from the lubricating strip 210, and the elongated strip displayed at the position of the first protrusion profile 218A has a greater width than that at (a) of FIG. 7.

FIG. 7 at (c) and (d), similar to the first and second protrusion profiles 218A, 2188 described above, shows that the third projection profile 218C and the fourth projection profile 218D display the elongated strips of the second color sequentially displayed in place thereof, resulting in an increased number of elongated strips of the second color. The earlier displayed elongated strips of the second color may continue to widen as the lubricating strip 210 is further used.

The lubricating strip 210 according to another embodiment of the present disclosure features that the first layer 212 and the second layer 214 have such boundary lines as configured to include the plurality of protrusion profiles 218 having peaks of different vertical heights, whereby displaying a varying number of elongated strips of the second color in response to increased degree of usage of the lubricating strip 210.

Thus, the user can intuitively recognize the degree of usage of the razor cartridge by confirming the number of elongated strips of the second color displayed on the lubricating strip 210.

Profiles of the at least one boundary line between the first layer and the second layer according to the present disclosure are not limited to those shown in FIGS. 1 to 7.

Accordingly, any further profiles may be embodied by the present disclosure provided a first layer and a second layer at least partially form boundary lines that are not parallel to the width direction of the lubricating strip.

In this regard, FIGS. 8A to 8D illustrate various embodiments of the profile of the boundary lines between the first layer and the second layer.

FIGS. 8A to 8D are diagrams of lubricating strips for a razor cartridge according to further embodiments of the present disclosure. Each of FIGS. 8A to 8D shows a lubricating strip 310, 410, 510, or 610, respectively, including a support portion 316, 416, 516, or 616, respectively, and corresponding hook 3162, 4162, 5162, or 6162, respectively. Each of the first layer 312, 412, 512, or 612 and the second layer 314, 414, 514, or 614 shown in FIG. 8A to 8D, respectively, includes a first shaving layer A1, a second shaving layer A2, and a third shaving layer A3.

As shown in FIG. 8A, profiles of boundary lines between the first layer 312 and the second layer 314 may have an inverted triangle shape.

In this case, protrusion profiles 318 may be provided on both sides of the lubricating strip 310, so that elongated strips as revealed by the first use of the lubricating strip 310 display the second color on both sides of the lubricating strip 310.

Figure 8B:
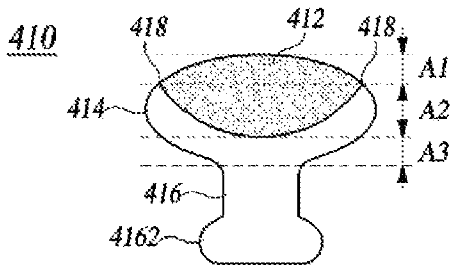

As shown in FIG. 8B, a lubricating strip 410 may include a first layer 412 and a second layer 414 jointly forming the profiles of a boundary line which has a concave down shape.

In this case, similar to FIG. 8A, protrusion profiles 418 may be disposed on both sides of the lubricating strip 410, so that elongated strips as revealed by the first use of the lubricating strip 410 display the second color on both sides of the lubricating strip 410.

Since the profile of the boundary line between the first layer 412 and the second layer 414 has the concave down shape, the reduction of the area of the first layer 412 with the use of the lubricating strip 410 may be made slower when compared with the configuration in FIB. 8B.

Figure 8C:
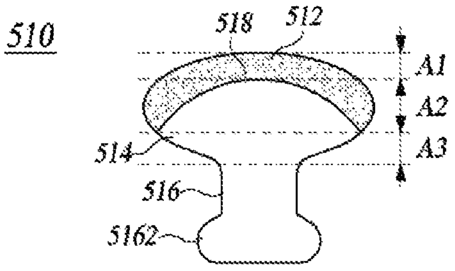

As shown in FIG. 8C, a lubricating strip 510 may include a first layer 512 and a second layer 514 jointly forming a profile of a boundary line that has a convex upward configuration.

In this case, a protrusion profile 518 may be provided in the middle of the lubricating strip 510 so that an elongated strip as revealed by the first use of the lubricating strip 510 may be displayed centrally of the lubricating strip 510 by the second color.

Since the profile of the boundary line between the first layer 512 and the second layer 514 has the convex upward configuration, the increase in the area of second layer 514 with the use of the lubricating strip 510 may be made faster when compared with the inverted triangle profile shown in FIG. 3.

Figure 8D:
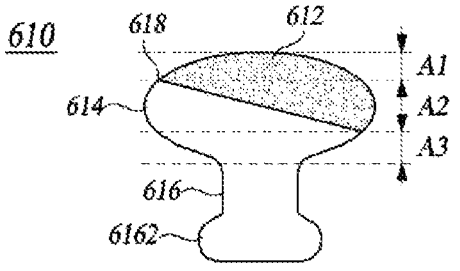

As shown in FIG. 8D, a lubricating strip 610 may include a first layer 612 and a second layer 614 jointly forming a profile of a boundary line which has a diagonal shape from the upper left to the lower right.

In this case, a protrusion profile 618 may be disposed on the left side of the lubricating strip 610 such that an elongated strip as exposed by the first use of the lubricating strip 610 is displayed on the left side of the lubricating strip 610 by the second color.

Since the profile of the boundary line between the first layer 612 and the second layer 614 has the diagonal shape, the increase of the second layer 614 due to the use of the lubricating strip 610 may be made by the second layer 614 progressively spreading its territory from left to right.

FIGS. 8A to 8D illustrate various embodiments of the profile of the boundary lines between the first layer and the second layer of the present disclosure, which, however, is not limited thereto, and the profiles of the boundary lines between the first layer and the second layer of the present disclosure may have various other shapes.

As described above, according to at least one embodiment of the present disclosure, the lubricating strip for the razor cartridge provides various indicators indicating the usage of the razor cartridge through two layers having different colors, thus offering convenience in using the razor.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the disclosure is not limited by the above explicitly described embodiments but by the claims and equivalents thereof.

What is claimed is:

1. A lubricating strip comprising:

a first layer comprising a first lubricating material having a first color; and a second layer disposed under the first layer and comprising a second lubricating material having a second color different from the first color, wherein the first layer and the second layer are configured to:

form at least one boundary line, which is not parallel to a straight line along a width direction of the lubricating strip, on a cross-section of the lubricating strip cut in a direction perpendicular to a longitudinal direction of the lubricating strip; and define multiple shaving layers including a first shaving layer comprising the first layer, a second shaving layer comprising the first layer and the second layer, and a third shaving layer comprising the second layer, the multiple shaving layers being arranged along a straight line parallel to a height direction of the lubricating strip, and wherein:

a thickness of the first shaving layer is less than a thickness of the second shaving layer in the height direction of the lubricating strip, the thickness of the second shaving layer is defined as a distance in the height direction of the lubricating strip between the highest point and the lowest point of the at least one boundary line, a top exposure surface of the lubricating strip is configured to display the first color alone when the lubricating strip has not been used, the second color is displayed on the top exposure surface of the lubricating strip when the lubricating strip has been used at least once, in the second shaving layer, a sum of widths in the width direction of one or more areas of the second layer exposed on an upper surface of the lubricating strip is configured to increase as the lubricating strip is worn, the first lubricating material and the second lubricating material are different from each other, the at least one boundary line forms a plurality of protrusion profiles, and respective heights of peaks of the protrusion profiles are different from each other, as the peaks of the protrusion profiles are sequentially exposed, a number of longitudinally elongated exposed strips having the second color increases, and a respective width of each of the exposed strips increases, a number of the peaks is at least three, and each of the protrusion profiles has a shape of an isosceles triangle.

2. The lubricating strip of claim 1, wherein a cross-section of the second shaving layer cut in a direction perpendicular to the height direction of the lubricating strip comprises at least a portion of the first layer and at least a portion of the second layer.

3. The lubricating strip of claim 2, wherein:

the first lubricating material and the second lubricating material comprise a water-soluble polymer and a water-insoluble polymer; and the water-soluble polymer of the first lubricating material has a weight ratio that is equal to or greater than a weight ratio of the water-soluble polymer of the second lubrication material.

4. The lubricating strip of claim 3, wherein the water-insoluble polymer of the first lubricating material has a weight ratio of 10% to 40% and the weight ratio of the water-soluble polymer of the first lubricating material is 60% to 90% when a total weight of the water-soluble polymer and the water-insoluble polymer is 100%.

5. The lubricating strip of claim 4, wherein the water-insoluble polymer of the second lubricating material has a weight ratio of 30% to 50% and the weight ratio of the water-soluble polymer of the second lubricating material is 50% to 70%.

6. The lubricating strip of claim 5, wherein the water-insoluble polymer of the first lubricating material and the water-insoluble polymer of the second lubricating material comprise at least one of polystyrene (PS), polypropylene (PP), polyethylene (PE), thermoplastic elastomer (TPE), acrylonitrile butadiene styrene (ABS), or polycarbonate (PC).

7. The lubricating strip of claim 3, wherein:

the first lubricating material and the second lubricating material further comprise a lubrication performance enhancer; and each of the lubrication performance enhancer of the first lubricating material and the lubrication performance enhancer of the second lubricating material has a weight ratio of 0.1% to 10%.

8. The lubricating strip of claim 7, wherein the lubrication performance enhancer of the first lubricating material and the lubrication performance enhancer of the second lubricating material comprise at least one of a superabsorbent polymer (SAP) or a polyalkylene oxide (PAO).

9. The lubricating strip of claim 2, wherein when the lubricating strip is mounted to a razor cartridge, a top exposure surface of the first layer comprises 95% to 100% of a surface area of the lubricating strip.

10. The lubricating strip of claim 2, wherein the first layer in the first shaving layer is configured to be removed when the lubricating strip is used for a first time.

11. The lubricating strip of claim 2, wherein when the lubricating strip is mounted to a razor cartridge, a surface area of the second layer exposed in the second shaving layer is configured to be increased as the lubricating strip is used more.

12. The lubricating strip of claim 2, wherein a boundary between the first layer and the second layer comprises at least one protrusion profile on the cross-section of the lubricating strip cut in the direction perpendicular to the longitudinal direction of the lubricating strip.

13. The lubricating strip of claim 12, wherein the boundary comprises a plurality of protrusion profiles respectively having different vertical peak heights.

14. A razor cartridge, comprising:

a blade housing comprising a guard, a cap, and at least one cutting blade disposed between the guard and the cap; and a lubricating strip disposed on at least one of the guard or the cap, wherein the lubricating strip comprises:

a first layer comprising a first lubricating material having a first color; and a second layer disposed under the first layer and comprising a second lubricating material having a second color different from the first color, wherein the first layer and the second layer are configured to:

form at least one boundary line, which is not parallel to a straight line along a width direction of the lubricating strip, on a cross-section of the lubricating strip cut in a direction perpendicular to a longitudinal direction of the lubricating strip; and define multiple shaving layers including a first shaving layer comprising the first layer, a second shaving layer comprising the first layer and the second layer, and a third shaving layer comprising the second layer, the multiple shaving layers being arranged along a straight line parallel to a height direction of the lubricating strip, and wherein:

a thickness of the first shaving layer is less than a thickness of the second shaving layer in the height direction of the lubricating strip, the thickness of the second shaving layer is defined as a distance in the height direction of the lubricating strip between the highest point and the lowest point of the at least one boundary line, a top exposure surface of the lubricating strip is configured to display the first color alone when the lubricating strip has not been used, the second color is displayed on the top exposure surface of the lubricating strip when the lubricating strip has been used at least once, in the second shaving layer, a sum of widths in the width direction of one or more areas of the second layer exposed on an upper surface of the lubricating strip is configured to increase as the lubricating strip is worn, the first lubricating material and the second lubricating material are different from each other, the at least one boundary line forms a plurality of protrusion profiles, and respective heights of peaks of the protrusion profiles are different from each other, as the peaks of the protrusion profiles are sequentially exposed, a number of longitudinally elongated exposed strips having the second color increases, and a respective width of each of the exposed strips increases, a number of the peaks is at least three, and each of the protrusion profiles has a shape of an isosceles triangle.

15. The razor cartridge of claim 14, wherein the width direction of the lubricating strip is perpendicular to the longitudinal direction of the lubricating strip.

16. The razor cartridge of claim 15, wherein the longitudinal direction of the lubricating strip is parallel to a longitudinal direction of the at least one cutting blade.

* * * * *